Feb. 21, 1961 H. E. ERDMAN 2,972,383
BEET HARVESTER AND CLEANING MACHINE
Filed March 19, 1959 3 Sheets-Sheet 1
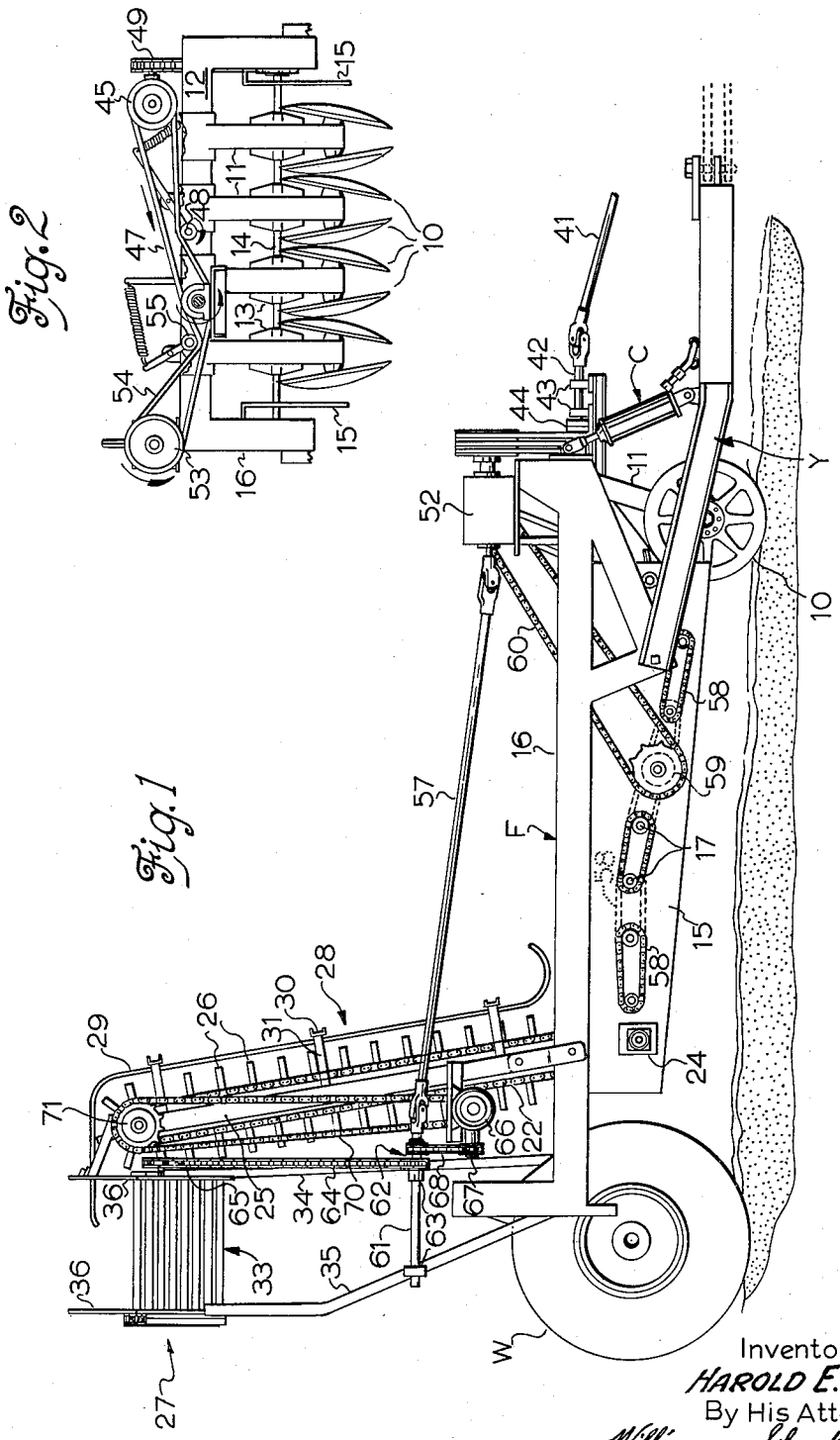
Inventor
HAROLD E. ERDMAN
By His Attorneys
Williamson, Schroeder & Palmatier Feb. 21, 1961  H. E. ERDMAN  2,972,383
BEET HARVESTER AND CLEANING MACHINE
Filed March 19, 1959  3 Sheets-Sheet 2
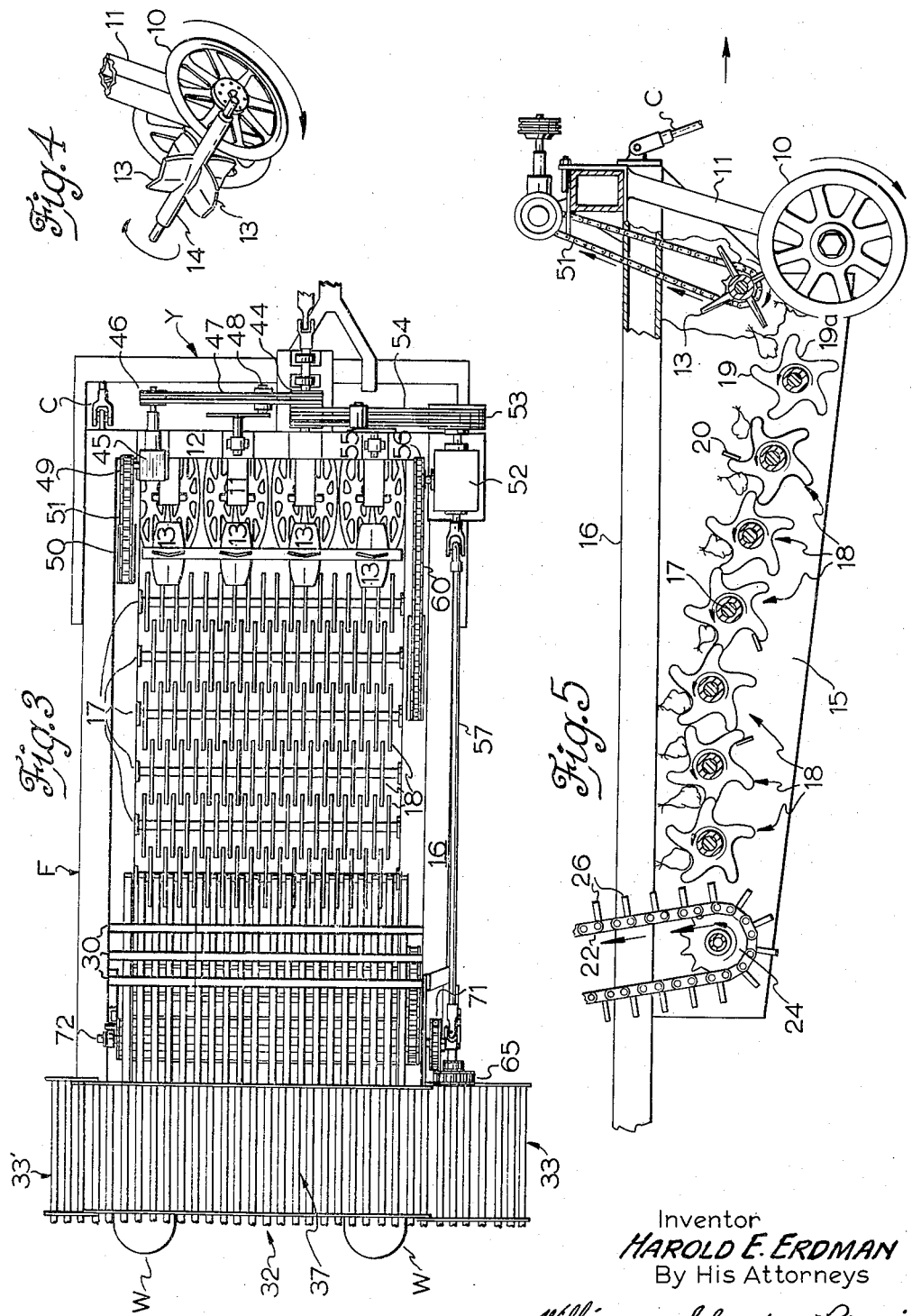
Inventor
*HAROLD E. ERDMAN*
By His Attorneys
*Williamson, Schroeder & Palmatier*

Feb. 21, 1961

H. E. ERDMAN 2,972,383

BEET HARVESTER AND CLEANING MACHINE

Filed March 19, 1959

Inventor
HAROLD E. ERDMAN
By His Attorneys
Williamson, Schroeder & Palmatier

United States Patent Office 2,972,383
Patented Feb. 21, 1961

2,972,383

BEET HARVESTER AND CLEANING MACHINE

Harold E. Erdman, Rte. 1, Crookston, Minn.

Filed Mar. 19, 1959, Ser. No. 800,514

4 Claims. (Cl. 171—53)

This invention relates to agricultural harvesters for root vegetables and in particular to a beet harvesting and cleaning machine.

An object of this invention is a self-contained beet harvesting and cleaning machine which digs up, cleans and elevates the clean beets to a transportation medium such as a truck or wagon in a continuous operation for direct delivery to the sugar beet mill.

Another object is a machine of the class described which cleans the beets better than machines presently known with a minimum of damage thereto.

Still another object is a machine of the class described wherein elevating and conveying means are provided which enable the clean beets to be delivered from either side into wagons or trucks having boxed side walls of varying elevation.

Still another object is a machine of the class described having improved cleaning mechanism and means for automatically cleaning itself and ridding itself of the clods of earth which would otherwise be carried along with the beets.

A still further object is a machine of the class described which is especially suitable for multiple operations wherein three and four rows of beets may be harvested and cleaned simultaneously.

These and other objects and advantages of my invention will more fully appear from the following description made in connection with the accompanying drawings wherein like reference characters refer to the same or similar parts throughout the several views, and in which:

Fig. 1 is a right side elevational view of the harvester of my invention;

Fig. 2 is a front elevational view of the harvesting unit with portions removed for better clarity thereof;

Fig. 3 is a top plan view;

Fig. 4 is a detail view of a harvesting unit employed in the machine of my invention, including a beet pickup wheel and the scoop paddle therefor;

Fig. 5 is a side elevational view of the cleaning mechanism of my harvester with portions thereof in section;

Figure 6:
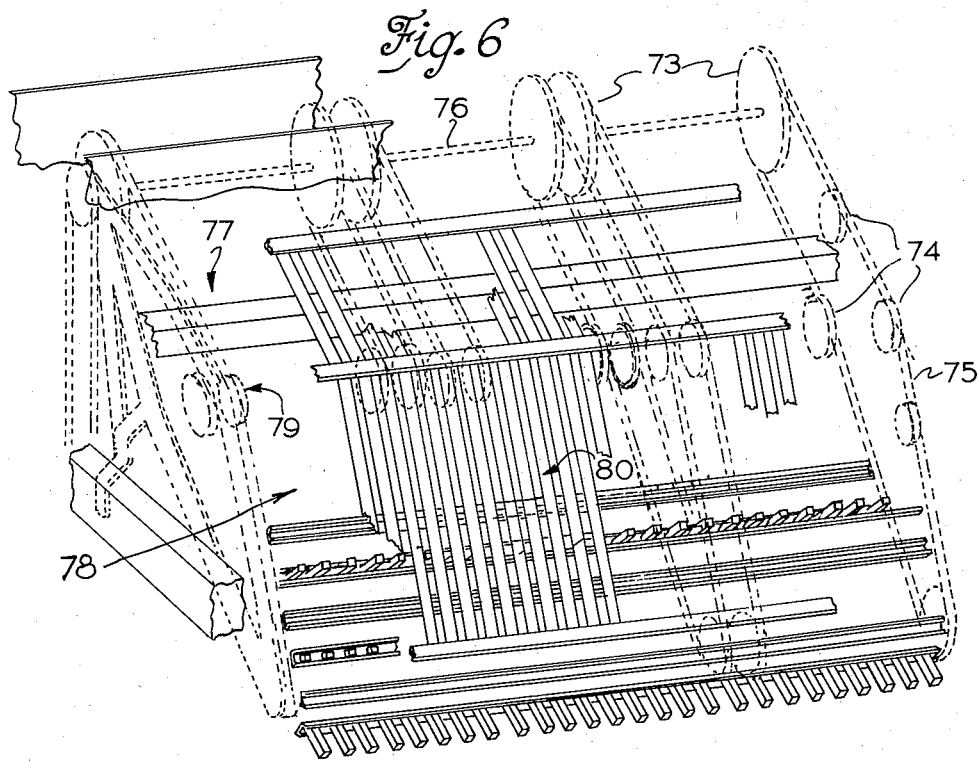
Fig. 6 is a diagrammatic view of an optional form of elevator mechanism which may be employed with the harvester of my invention.

The harvester of my invention broadly includes in combination a harvesting unit, a cleaning and conveying unit and an elevating and delivery unit, all of said units being mounted on a mobile frame and adapted to be drawn by a vehicle such as a tractor or truck.

Referring to the drawings for a preferred embodiment of my invention, the harvesting, the cleaning and conveying, and the elevating and delivery units are mounted on and supported by a rigid generally rectangular main frame F which is supported rearwardly by means of a pair of wheels W to provide mobility to the device and is pivotally supported forwardly by means of a rigid yoke hitch Y which is attached to and drawn by a self-propelled vehicle such as a tractor (not shown). The frame is adapted to be raised and lowered forwardly so as to raise the harvesting unit into transport position and lower it into harvesting or working position by means of a pair of hydraulic cylinders C pivotally mounted on the yoke hitch and connected to said hitch and said frame and interposed in a fluid pressure control system accessible to the tractor operator.

The harvesting unit is best shown in Figs. 2, 3 and 4 which show a unit adapted to harvest four adjacent rows of beets simultaneously, and consists of four pairs of beet lifting wheels or cambered, slightly concave or dish shaped pickup disks 10 rotatably mounted in spaced apart substantially axial alignment, each pair of pickup disks being rotatably mounted on and supported by a vertically inclined supporting arm 11 mounted on the front cross beam 12 of the frame F and depending downwardly and slightly backwardly therefrom. The pickup disks rotate forwardly as they are drawn through the rows of beets by the advancing implement, and are adapted to dig into the soil and under the beet and deliver the beets upwardly and rearwardly between each pair of disks. Each pair of said disks are inclined from one another so as to converge and be closest together at the lowest point of their periphery and farthest apart at the topmost point on their periphery.

A paddle unit is mounted slightly above and somewhat behind each pair of pickup disks, each paddle unit consisting of a plurality of circumferentially spaced and aligned scoop paddles 13 which are preferably of V-shape or generally concave cross section and are mounted on and extend radially from a common rotatable horizontal drive shaft 14 which spans the width of the harvester and is supported at each end by elongate vertical mounting plates 15 which are mounted inwardly of and dependingly supported by the side beams 16 of the main frame. The paddles are of such length and are so positioned that when rotated, they extend into and sweep the area between each pair of disks and engage or pick up the beets which have been unearthed and raised by the disks and throw the beets backward onto the cleaning and conveying unit hereafter to be described. The paddles of each unit are preferably circumferentially staggered with respect to the paddles of the outer units so that each paddle engages a beet at a slightly different increment of time to relieve the strains on the shaft 14 upon which they are mounted, which strain is considerably multiplied when the paddle units are synchronized so a paddle from each unit engages a beet simultaneously.

The cleaning and conveying unit is designed to receive the beets from the paddles and progressively and continuously moves the beets rearwardly to the elevating and delivery unit hereinafter to be described and is adapted to clean the beets by removing the soil which normally adheres to said beets when first dug up or harvested. It accomplishes this cleaning by lightly jostling or agitating the beets as they progress or travel rearwardly of the cleaning unit, the cleaning mechanism being designed to not only agitate the beets but to also turn over the beets so that various portions thereof are contacted by the cleaning and conveying unit in the course of travel across the cleaning unit.

The cleaning unit includes a longitudinal conveyor consisting of a plurality of horizontally spaced elongate rotatable shafts or axles 17 which are supported at each end by the mounting plate 15 and span the opening defined by the side beams 16 of the frame, each of said shafts having mounted thereon and normal thereto a plurality of uniformly spaced apart aligned star shaped disks or rinks 18 which are rotated in a rearward or counterclockwise direction (as seen in Fig. 5) by the shafts 17 to successively deliver the beets from one rink roll to the next adjacent one so as to move or convey the beets rearwardly to the elevator, hereafter to be described, each shaft and the disks or rinks carried thereon forming a rink roll. The rinks on adjacent shafts overlap each other at their end portions and are staggered or offset with respect to one another so that a rink on one shaft is disposed between and passes through the space defined by adjacent rinks on the adjacent shaft.

The rinks are best shown in Fig. 5 and preferably consist of a plurality (five are shown in the drawings) arcuate fingers 19 curving generally in a somewhat forward or clockwise direction, each of said fingers having smoothly rounded ends or peaks, the valley 19a (as viewed in Fig. 5) joining each finger also being smoothly contoured in a curved or arcuate fashion so that the surfaces which engage the beets are all smoothly rounded in order to reduce or minimize the damage which might be sustained by the beets being engaged by said rinks or fingers thereof. In short, the rinks are entirely curvilinear on their periphery. The rinks on each shaft are preferably substantially aligned with one another so that the rink valleys 19a line up to define a plurality of continuous elongate concaved channels extending the length of each shaft.

Each rink on every other shaft is provided with a rectangular shoe or paddle 20 affixed to the trailing surface of one of the fingers on said rink, which shoes or paddles are adapted to sweep the area between the rinks on adjacent shafts to remove any clods or dirt which accumulates between the rinks and knocks the dirt to the ground below, the area beneath the rink rolls being exposed to the ground. The shoes are preferably circumferentially staggered in spiral fashion around each shaft to better distribute the stress an dstrain thereon. These shoes or paddles are particularly useful when the beets are being harvested from wet, sticky soil.

The conveyor shafts 17 in the front portion of the conveying and cleaning unit are disposed at progressively higher elevations than the preceding shafts while those in the rear portion are of the same elevation, the overall effect being an inclined bed which rises gradually from front to back and levels off in the back portion adjacent the elevator. This arrangement minimizes the build up of beets at the back of the conveyor adjacent the elevator. The shafts 17 and the rinks 18 carried by said shafts are rotated in a backward or counterclockwise direction (as seen in Fig. 5) so as to progressively and continuously deliver the beets from one rink roll to another along the conveyor to the elevator, the beets being gently jostled, bounced and turned by the rinks to shake loose the soil and vegetation clinging thereto which drops between the rinks to the ground below. Alternate shafts are preferably driven at different speeds, particularly during the wet harvesting season to permit the shoes or paddles 20 to sweep the entire circumference of the area between the rinks.

The elevating unit is disposed rearwardly of the machine adjacent the last rink roll and is designed to pick up substantially clean beets as they pass from the last rink roll and elevate them to a lateral or cross conveyor hereinafter to be described. The elevating unit consists of a plurality of vertically spaced horizontally disposed elongate members or flights 21 which are affixed at each end to a pair of endless chains 22 disposed on each side of the elevator and trained around sprockets 23 and 24 disposed at each end of the elevator, the upper sprockets 23 being carried and supported by the upstanding elevator support members or standards 25 which are mounted on the side beams 16 of the main frame, so as to form a continuous belt or elevator. The flights carry a plurality of horizontally spaced apart beet lifting fingers 26 which extend outwardly therefrom, the elevator being somewhat rearwardly inclined from the vertical to retain the beets on the fingers. The elevator is designed to pick up the beets from the last rink roll and carry them upwardly to the top thereof where they fall off into a cross conveyor 27 to be described hereinafter. A retaining screen 28 is provided outwardly of the conveyor to assist in retaining the beets on the beet lifting fingers and is disposed in spaced parallel relation to the face of the elevator, the screen 28 in the illustration shown consisting of a plurality of vertically disposed metal straps 29 maintained in horizontally spaced apart relationship by horizontal supporting bars 30 to which the straps are affixed, the bars 30 being mounted on the elevator standards 25 by means of suitable brackets 31. The lower ends of the metal straps 29 are curved upwardly above the rink roll to deflect the bouncing beets downwardly onto the rink rolls with as little damage as possible and the upper ends thereof are curved downwardly so as to direct the beets from the elevator into the cross conveyor 27.

The cross conveyor 27 is mounted above the wheels W and behind the elevator so as to receive the beets therefrom and may consist of any well known belt or conveyor construction preferably open in nature to permit any dirt remaining on the beets to pass therethrough as they are delivered to the truck or wagon and is adapted for reversible movement in either direction so that the beets may be delivered to either side of the machine. The cross conveyor 27 is preferably multi-sectional, and consists of a main or central portion 32 to which is attached at each end thereof a pair of pivotally mounted wing conveyors 33 and 33' which may be raised or lowered as desired to deliver the beets from either side of the machine at varying elevations and which may be raised to a substantially vertical position when not in use so as not to extend substantially outwardly from the machine, thereby permitting ready movement of the machine down roads or throughways of rather narrow widths.

The cross conveyor is mounted on the frame by means of standards 34 and dog leg supporting members 35, and includes a pair of side walls 36 having an endless open work conveyor belt 37 of any well known design, such as the spaced parallel rods or links shown in the drawings.

Figure 7:
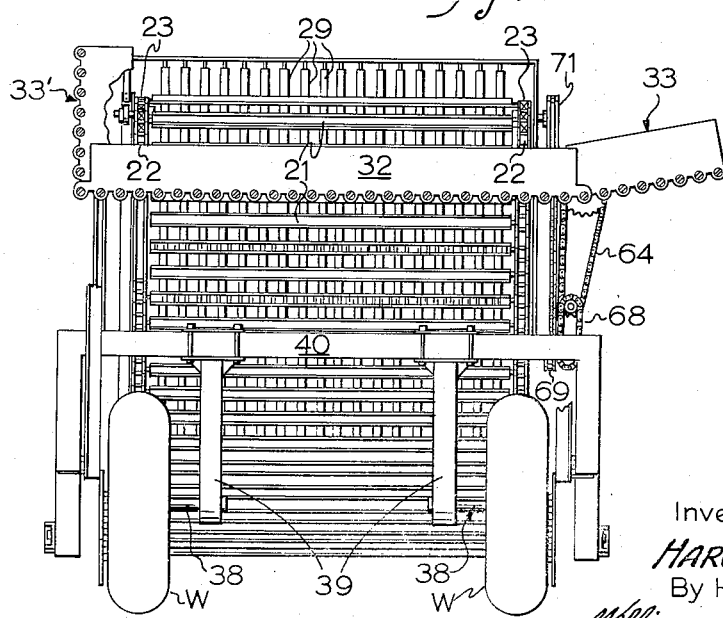
Fig. 7 is a rear elevational view.

As best seen in Fig. 7, the wheels W are rotatably mounted on dead axles 38, which in turn are mounted on rigid vertical wheel supporting members 39, which are suspended from the rear cross beam 40 of the main frame.

The driving power for the driven members of my machine is provided by a power takeoff unit on the tractor (not shown) through a universal drive shaft 41 which in turn drives a power takeoff unit mounted on the front cross beam 12 of the main frame and including a power takeoff shaft 42 journalled in suitable bearings 43 and carrying a double grooved sheave 44.

The driving power is transmitted to the scoop paddles 13 and paddle shaft 14 through a gear box 45 mounted on the left front corner of the main frame F (looking in the direction of movement), the gear box 45 being provided with a drive pulley 46 mounted forwardly thereof and driven by a belt 47 and trained about the pulley 46 and sheave 44, and held taut by a belt tightner 48. The gear box 45 also carries a drive sprocket 49 on the side thereof which drives a sprocket 50 mounted on the end of the paddle shaft 14 by means of an endless chain 51 trained around said sprockets.

Driving power is transmitted to the rink rolls, elevator and conveyor through a suitable gear box 52 mounted on the right front corner (looking in the direction of movement) and carrying a pulley 53 forwardly thereof driven by a belt 54 trained around said pulley and sheave 44 and held taut by a belt tightner 55. The gear box 52 also is provided with a sprocket 56 mounted on the inner side thereof adapted to transmit driving power to the rink rolls, and a universal drive shaft 57 mounted rearwardly thereof for transmitting power to the elevator and conveyor.

The rink roll shafts 17 are provided with suitable sprockets that are interconnected for synchronized rotation by endless chains 58 trained around said sprockets in suitable fashion, the driving power being applied to said sprockets and shafts through a large drive sprocket 59 driven by an endless chain 60 trained around sprocket 59 and gear box sprocket 56. Since as indicated previously, it is preferable to have adjacent rink rolls rotating at different speeds, adjacent shafts 17 are provided with different sized sprockets to achieve this speed differential.

The universal drive shaft 57 is drivingly connected with a power takeoff unit mounted at the rear of the machine on the conveyor standard 34, which unit includes a power takeoff shaft 61 carrying a double sprocket gear 62 and journalled in suitable bearings 63. An endless chain 64 is trained around the double sprocket gear 62 and a conveyor drive sprocket 65 positioned above it, through which sprocket and chain arrangement driving power is furnished to the cross conveyor 27.

Drive power is transmitted to the elevator through a gear box 66 mounted on elevator standard 25, said gear box carrying a sprocket 67 rearwardly thereof having an endless chain 68 trained around it and double sprocket gear 62, and a sprocket wheel 69 carried on the inner side of said gear box which is drivingly connected by means of an endless chain 70 with a drive sprocket 71 mounted at the top of the elevator on the elevator standard 25, said drive sprocket 71 driving sprocket wheels 23 (which carry the endless elevator chains 22) through the medium of a common drive shaft 72 upon which sprockets 23 and 69 are mounted.

Fig. 6 somewhat diagrammatically illustrates another form of elevator unit which may be employed in the machine of my invention. In this form, the elevator is divided into a plurality of vertical sections (three in the form shown), each section having its own group of drive and idler sprockets 73 and 74 respectively interconnected by endless chains 75 and simultaneously driven through the medium of a common drive shaft 76 by means previously described and not shown in Fig. 6. The upper portion 77 of the elevator is inclined backwardly at a greater angle from the vertical than the lower portion 78. This inclined and multi-sectional arrangement provides for a somewhat stronger elevator and reduces the strain thereon. In this form there is no necessity for the screen 80 to extend any considerable distance beyond the juncture 79 of the upper and lower portions, since the increased angle of the upper portion eliminates the possibility of the beets falling off the conveyor, and therefore, in the form shown the upper end of the screen terminates just above the juncture of the upper and lower portions of the elevator.

In use, my machine is properly aligned with the rows of beets, and lowered to harvesting or working position. As the machine is drawn forwardly by the tractor, the pickup disks engage the beets and carry them upwardly and rearwardly, where they are engaged by the rotating scoop paddles and thrown backwardly onto the rink rolls. The revolving rink rolls progressively and continuously carry the beets to the elevator at the rear of the machine, and in so doing, lightly throw or roll the beets to each succeeding rink roll, simultaneously jostling, bouncing and turning the beets to remove the dirt and vegetation clinging thereto, so that by the time the beets reach the elevator substantially all of the dirt and vegetation has been removed therefrom. The elevator then takes up the clean beets and delivers them to the cross conveyor, where they are conveyed to either side at the option of the operator and delivered to the trucks or wagons disposed beneath one of the wing conveyors which has been lowered to a suitable elevation.

It should be noted that the action of the rink rolls in transporting and cleaning the beets is unusually effective. Because the rinks have no sharp corners or projections, the damage to the beets resulting from contact with the rinks is held to a minimum, and the rinks are rotated at sufficiently slow speeds so that no severe impact occurs when they engage the beets. The beets are lightly thrown or rolled from one rink roll to another so that jostling or vibration occurs in the beets sufficient to shake the dirt and vegetation loose without causing cutting or bruising of the beets.

Thus the beets from a plurality of rows are harvested, cleaned and elevated to a transport means in one continuous straight-through operation in such a manner that the beets are cleaner than has heretofore been possible by previously available devices, with the cleaning being accomplished with a minimum of damage resulting to the beets. It is also important to note that in this machine the beets are handled in numerous ways by a variety of units or mechanisms, each unit having what might be termed a dual function or purpose, the first being to assist in the overall continuous operation of removing the beets from the soil and placing them in wagons or trucks, the second being to assist in some manner in cleaning the beets by removing the soil and vegetation which normally clings to the beets when they are removed from the soil. Thus, the pickup wheels lift the beets from the soil, leaving behind all the soil that does not positively cling to the beets, the scoop paddles slap or throw the beets from the pickup wheels to the rink rolls, and in so doing obviously remove a major portion of the dirt remaining. The rink rolls agitate, jostle, bounce and turn the beets as they carry them rearwardly to the elevator, removing substantially all of the dirt remaining on the beets. The slight agitation, normally associated with elevators and conveyors of the type described and contemplated for this invention, removes what little dirt might be left on the beets after leaving the rink rolls. By handling and agitating the beets in several different ways, cumulative effect of these different treatments is to clean the beets to a remarkable degree. In addition, it is well to note that the entire device is so designed that any earth or vegetation shaken loose or removed from the beets is immediately removed or eliminated from the machine so that the same or other beets do not re-contact this dirt so as to necessitate its re-removal.

It will, of course, be understood that various changes may be made in the form, details, arrangement and proportions of the parts without departing from the scope of my invention which consists of the matter shown and described herein and set forth in the appended claims.

It will also be noted that the beet lifting fingers carried by the elevator flights may be grouped together in series over only a portion of the width of the flight, with each series of fingers being in horizontally spaced and vertically staggered relationship with respect to the series of fingers carried by other flights on the elevator. This arrangement is sometimes necessary to relieve the strain on the elevator which might otherwise occur were each elevator flight to engage beets across substantially its entire width simultaneously.

What I claim is:

1. Apparatus for harvesting and cleaning sugar beets and the like including an elongate mobile frame, said frame having mounted thereon in sequence from front to rear a harvesting unit including a plurality of spaced apart pairs of cambered beet pickup wheels, a rotary paddle mounted rearwardly of each of said pickup wheels for removing the beets from the wheels and throwing them rearwardly, a longitudinal conveyor and cleaning unit for simultaneously cleaning and conveying said beets mounted immediately behind and below said paddle and adapted to receive the beets from the paddles, said conveyor and cleaning unit including a plurality of rotary shafts disposed normal to the direction of movement and carrying thereon a plurality of circumferentially spaced apart radially extending arcuate beet engaging and cleaning elements adapted to progressively deliver the beets to the next adjacent elements in agitated fashion, and elevator means adjacent the rear end of said longitudinal conveyor for removing the beets from the conveyor and elevating them to transverse cross conveyor mounted adjacent the rear end of said frame for delivering the cleaned beets to a receptacle aside said frame, said conveyor and cleaning unit constituting the only means between said harvesting unit and elevator means for engaging and cleaning the beets.

2. The apparatus of claim 1 wherein the rotary paddles are of concave cross-section.

3. A mobile self-contained device for harvesting and cleaning root vegetables such as beets and the like comprising an elongate generally rectangular frame mounted for mobile movement, harvesting means carried forwardly of said frame, said harvesting means being adapted to lift said beets upwardly and rearwardly thereof, a longitudinal cleaning conveyor adjacent said harvesting means, means adapted to remove the beets from the harvesting means and direct them rearwardly onto the longitudinal cleaning conveyor disposed immediately below and behind said last named means to prevent any appreciable falling movement of said beets as they are delivered thereto to avoid damage thereto, said longitudinal conveyor including a plurality of horizontal spaced apart rotary shafts disposed normal to the direction of movement, each of said shafts carrying thereon a plurality of beet engaging elements adapted to engage the beets and gently direct them rearwardly to the next adjacent beet engaging elements, said beets being substantially cleaned upon reaching the end of travel on said conveyor, continuous elevating means carrying beet engaging members adapted to remove the beets from the longitudinal cleaning conveyor and deliver them to a second conveying unit rearwardly of said frame, said second conveyor being adapted to deliver the beets from one side of the apparatus, said beet engaging elements being of generally star-shaped configuration and including a series of circumferentially spaced apart arcuate radially extending fingers, the beet engaging elements on alternate shafts being provided with shoe members secured to the outer end portions of the fingers thereof, said shoe members being of a size to extend into the area defined by opposing beet engaging elements on the adjacent shafts and span the major portion of the distance between said opposing elements to sweep the area therebetween and remove the dirt therefrom previously removed from the beets.

4. The apparatus of claim 3 wherein the fingers of said beet engaging elements on adjacent shafts overlap and are offset from one another and wherein adjacent horizontal conveyor shafts are rotated at differential speeds.

References Cited in the file of this patent

UNITED STATES PATENTS

| | | |
|---|---|---|
| 2,637,964 | Orendorff | May 12, 1953 |
| 2,688,222 | Sorensen et al. | Sept. 7, 1954 |
| 2,763,113 | Sorensen et al. | Sept. 18, 1956 |